United States Patent [19]

Reed et al.

[11] Patent Number: 5,081,494
[45] Date of Patent: Jan. 14, 1992

[54] JOB SUPPLEMENT FOR ELECTRONIC PRINTING MACHINES

[75] Inventors: Jeffrey G. Reed, Pittsford, N.Y.; Acco Hengst, Lewisville, Tex.; Cynthia A. Smith, Pittsford; Kurt T. Knodt, Rochester, both of N.Y.

[73] Assignee: Xerox Corporation, Stamford, Conn.

[21] Appl. No.: 538,453

[22] Filed: Jun. 15, 1990

[51] Int. Cl.⁵ .............................................. G03G 21/00
[52] U.S. Cl. .................................... 355/202; 271/256; 346/160; 355/313; 364/181
[58] Field of Search ............... 355/202, 313, 314, 200, 355/325; 346/153.1, 160, 300, 296; 364/525, 160, 181; 271/256, 257, 258

[56] References Cited

U.S. PATENT DOCUMENTS

| 4,273,439 | 6/1981 | Markham et al. | 355/314 |
| 4,573,084 | 2/1986 | Iida | 358/300 |
| 4,705,393 | 11/1987 | Ito | 355/314 |
| 4,757,348 | 7/1988 | Rourke et al. | 364/525 |
| 4,786,940 | 11/1988 | Daniele | 346/160 |
| 4,870,458 | 9/1989 | Shibuya et al. | 355/200 |
| 4,956,667 | 9/1990 | Gartner | 355/202 |
| 4,961,092 | 10/1990 | Rabb et al. | 355/325 X |

Primary Examiner—A. T. Grimmley
Assistant Examiner—Sandra L. Hoffman
Attorney, Agent, or Firm—Frederick E. McMullen

[57] ABSTRACT

An electronic printing system having a scanner for scanning documents and converting the document images to image signals, a printer for making prints from image signals, and a programmer for programming job selections including a job supplement selection, programming job supplement enabling plural smaller jobs to be combined for a print job and preventing the scanner from scanning a new job until the job supplement program is completed.

7 Claims, 12 Drawing Sheets

JOB SUPPLEMENT FOR ELECTRONIC PRINTING MACHINES

The invention relates to electronic printing system, and more particularly, to a job supplement process for enabling print jobs to be built up from different document sources or to meet specialized job requirements.

Electronic printing systems typically employ a scanner for scanning image bearing documents and convert the image to image signals or pixels for use in making prints. The job source usually consists of a quantity of documents having the same or similar parameters that enable the documents to be scanned en masse and without special treatment for individual documents. In some cases, however, the job may include diverse documents that require special treatment and therefore cannot be scanned with the other documents in a single scan. Similarly, the job program may necessitate that some documents be processed apart from the other documents that comprise the job. For example, a job may consist of a plurality of text bearing documents, with one or more pictures. Because the pictures are continuous tone images and therefore require processing different than the text images, the documents cannot be scanned together in one pass if image processing of both types is to be optimized. In other cases, the documents may differ in size and thus require different scaling ratios to provide prints of the same size, some documents in a job may be fragile and require manual handling rather than be subjected to the possibility of damage by an automatic document handler, a job may consist of both documents in the form of individual sheets and computer form, etc. In these and the manifold other situations in which special processes are required, it would be highly desirable if a system or procedure to allow these special cases to be handled expeditiously and efficiently existed.

In the prior art, U.S. Pat. No. 4,573,084 to Iida discloses a document filing system in which the image data is optically read into RAM by scanning the documents and the data stored, with means provided to enable the RAM to be searched quickly and the data retrieved for display or printing. U.S. Pat. No. 4,757,348 to Rourke et al discloses a high speed electronic reprographic/printing machine with scanner in which job tickets which are assembled with the documents to be processed, each job ticket having a bar code enabling job instructions previously programmed in to be accessed. And, U.S. Pat. No. 4,786,940 to Daniele, discloses a data handling and archiving system in which hard copy prints are used as the archiving material, with means enabling the data archived to be protected through encoding and accessed through special recognition constraints.

In contrast, the present invention provides a job supplement process for a printing system effective when actuated to enable a print job to be built up from a plurality of smaller print jobs, the printing system including document scanning means with a platen on which documents to be scanned are placed, the scanning means having automatic and manually assisted document handling modes for inputting documents to the platen for scanning and converting the document images to image signals for use in making prints, the steps comprising: automatically implementing job supplement in response to operation of the scanning means in the manually assisted document handling mode; manually implementing the job supplement in response to operation of the scanning means in the automatic document handling mode; and preventing scanning of the next job by the scanner in response to implementation of the job supplement process.

Figure 1:
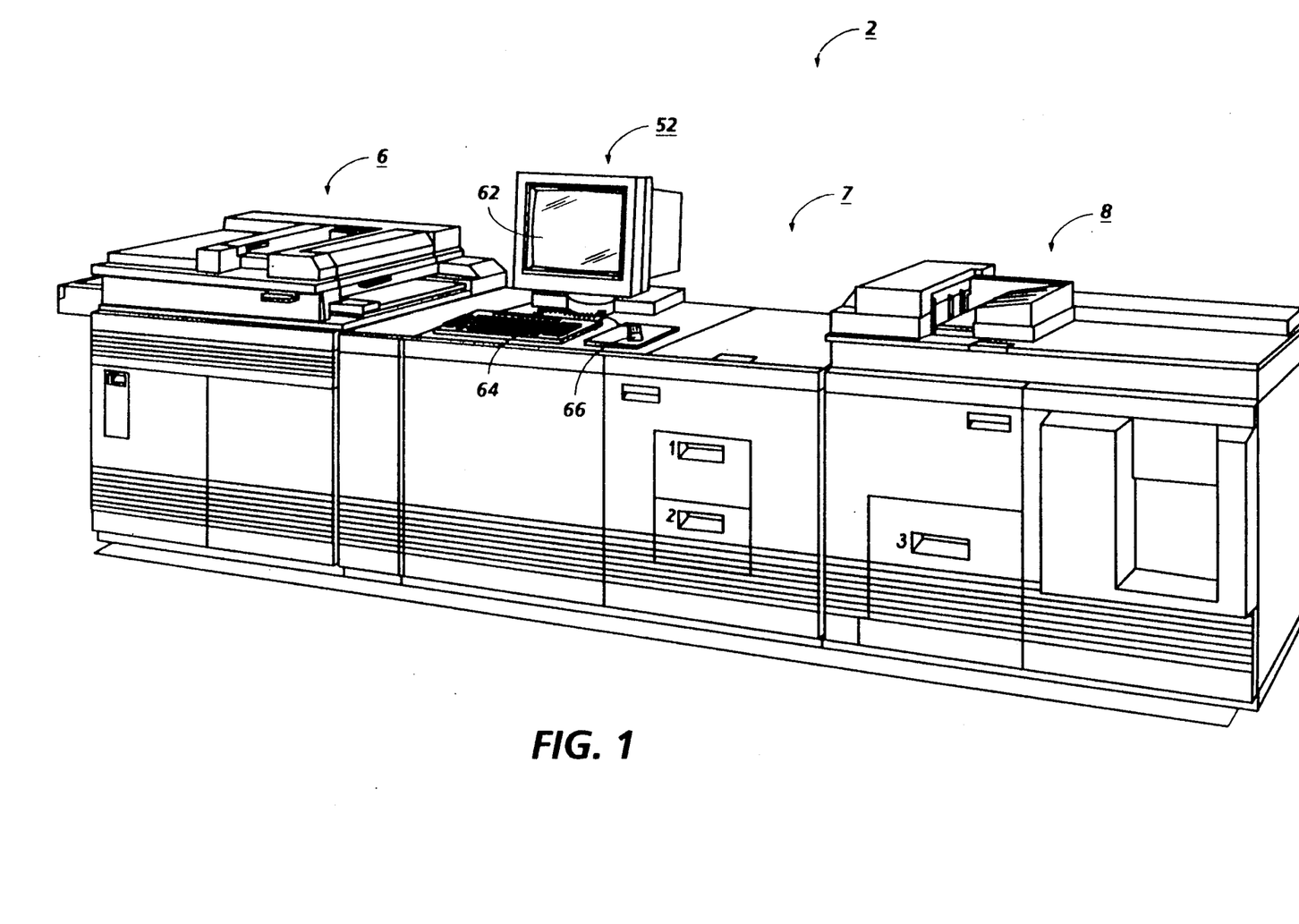
FIG. 1 is a view depicting an electronic printing system with the job supplement of the present invention allowing building of print jobs from diverse inputs or in response to special programming instructions.
Figure 2:
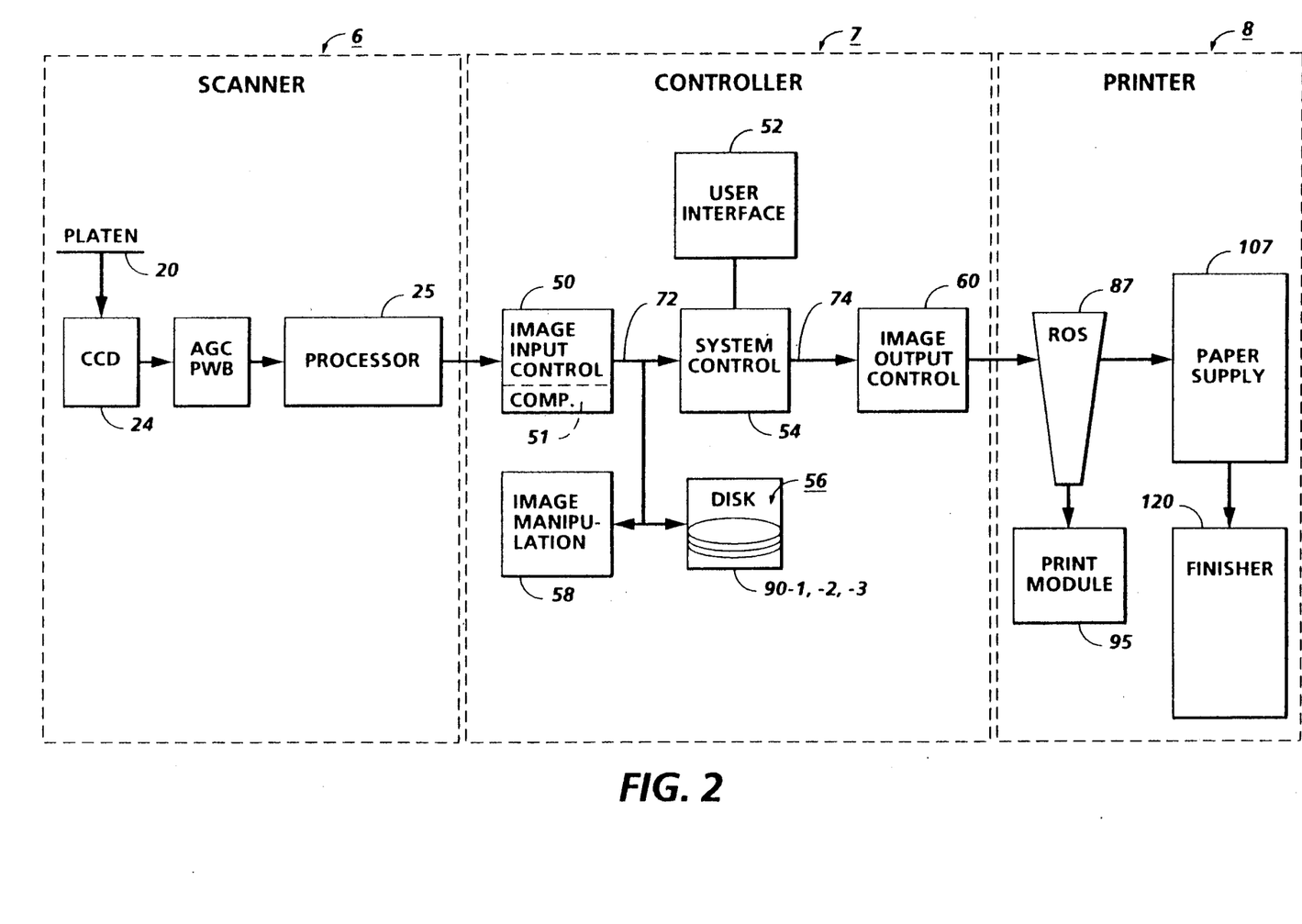
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
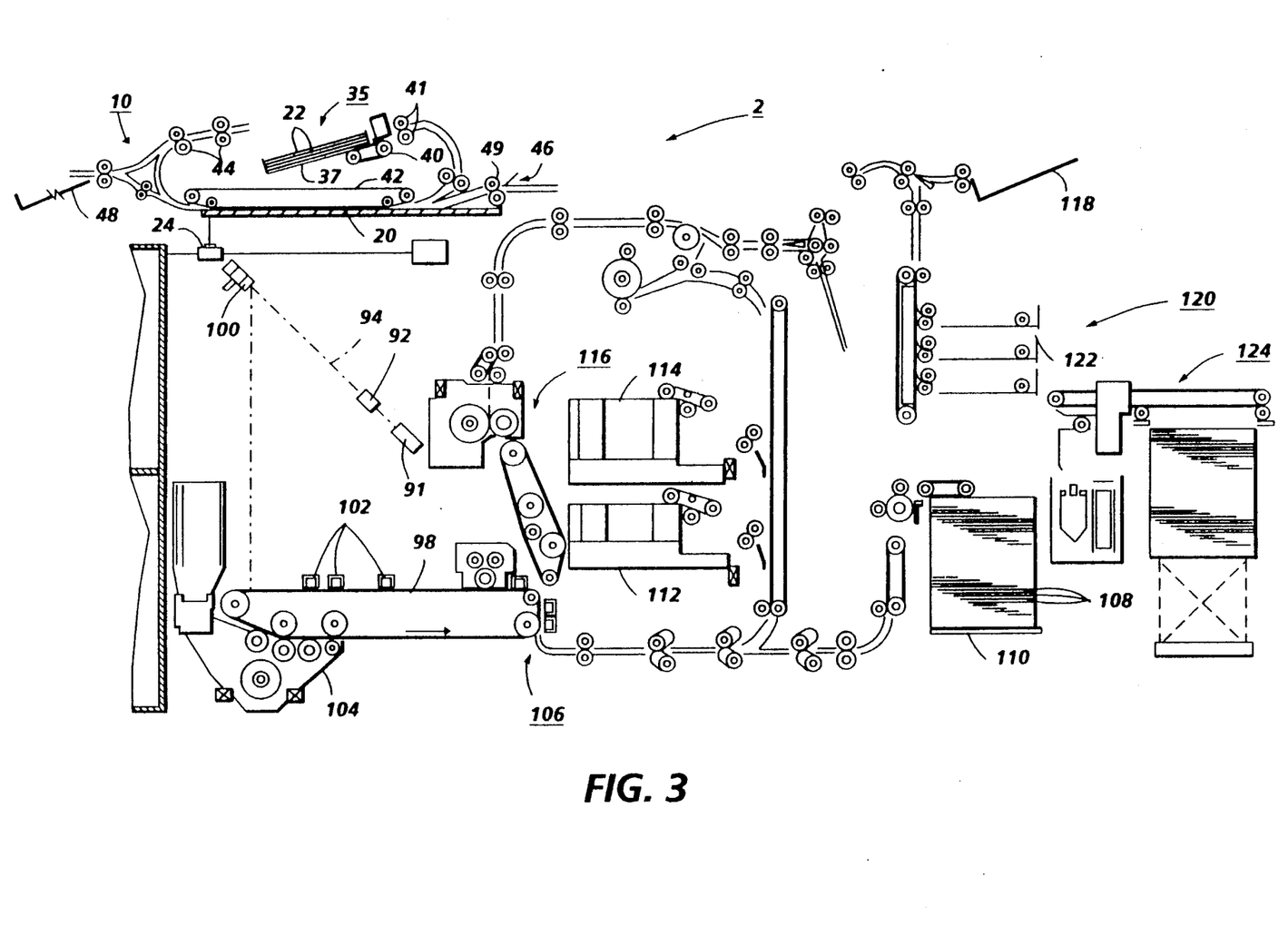
FIG. 3 is a plan view illustrating the principal mechanical components of the printing system shown in FIG. 1.
Figure 4:
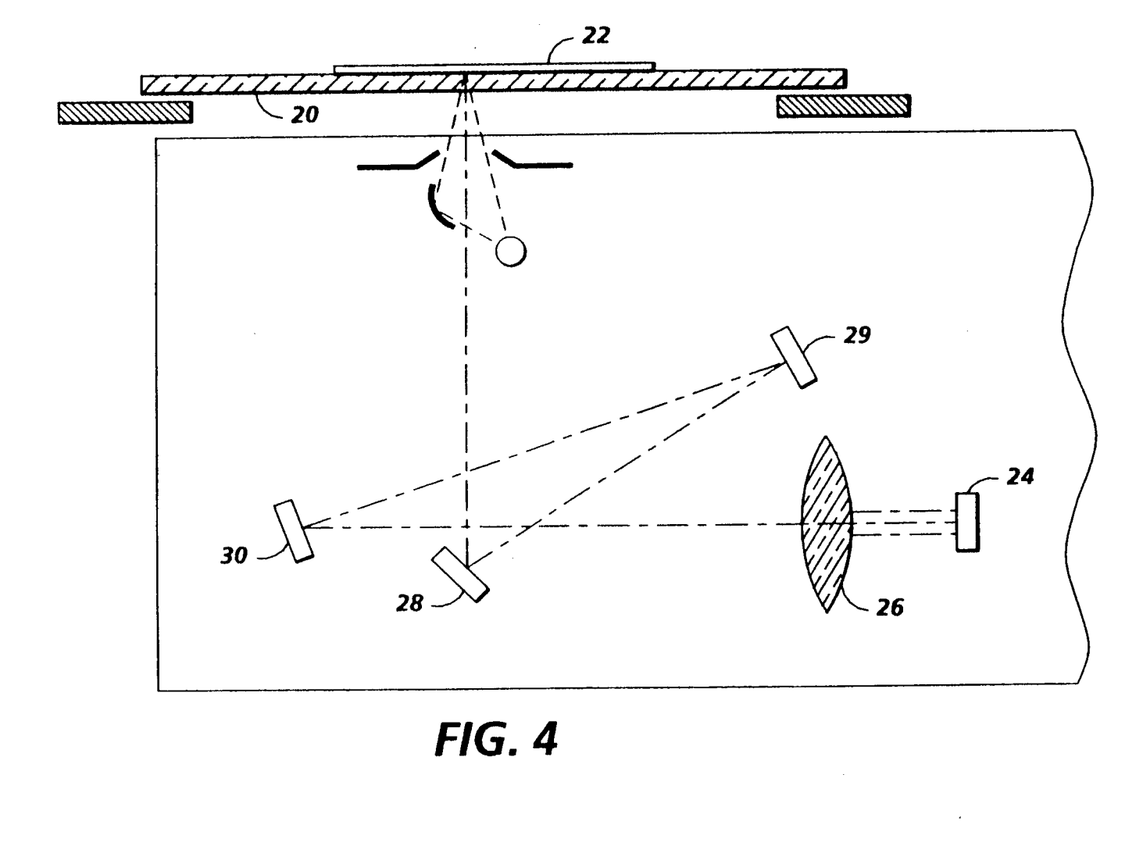
FIG. 4 is a schematic view showing certain construction details of the document scanner.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5A:
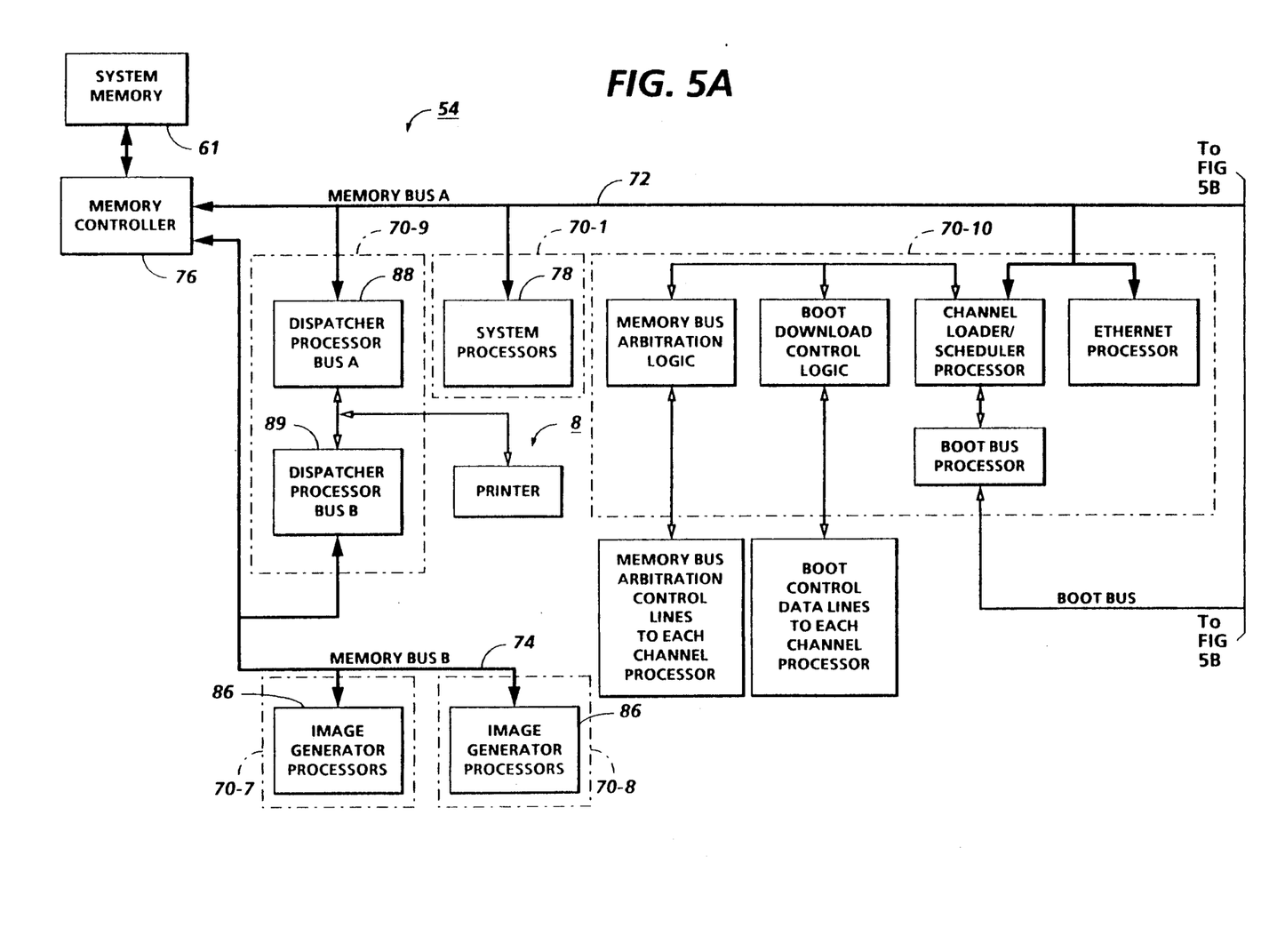
FIGS. 5A, 5B, and 5C comprise a schematic block diagram showing the major parts of the system control section.
Figure 5B:
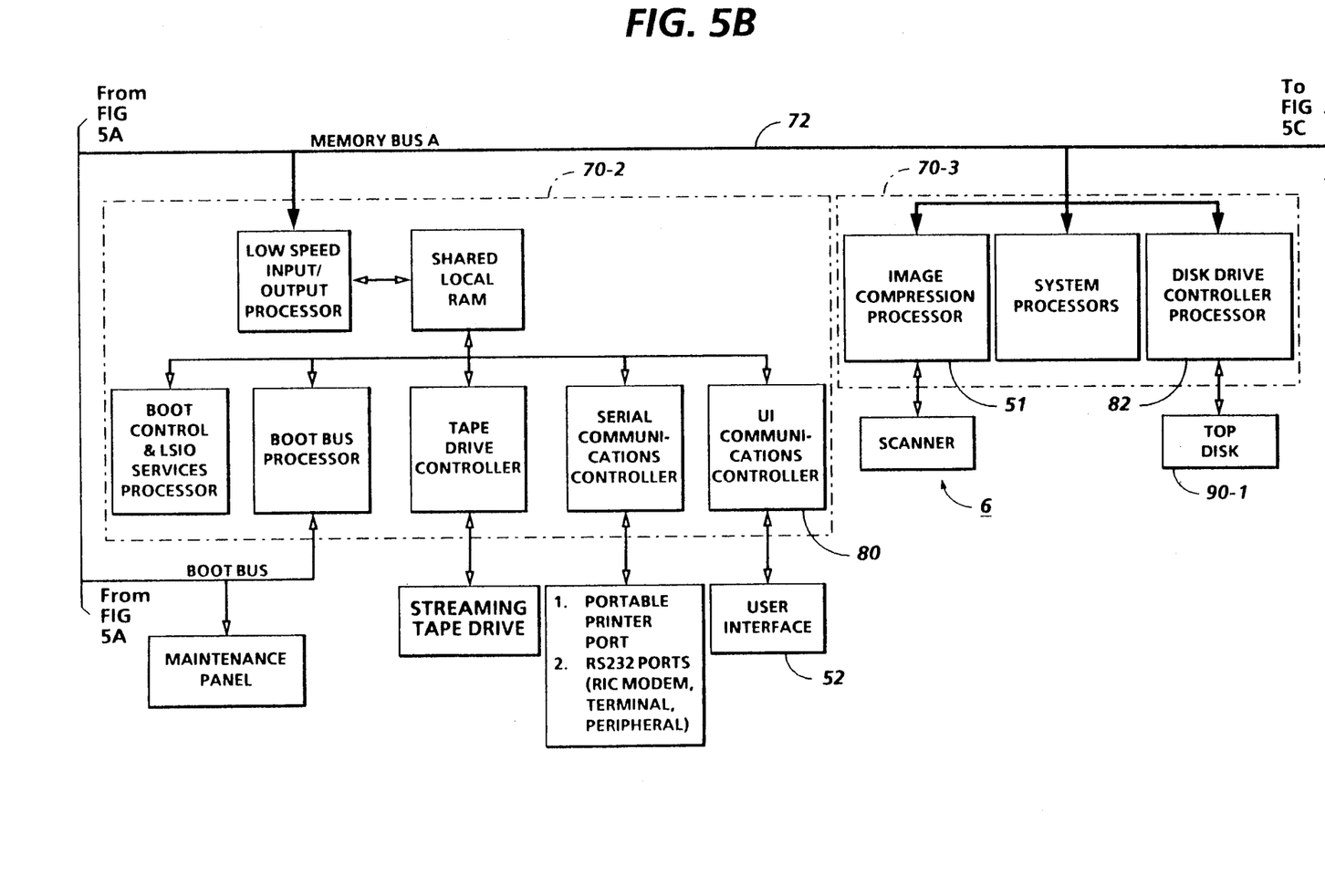
Figure 5C:
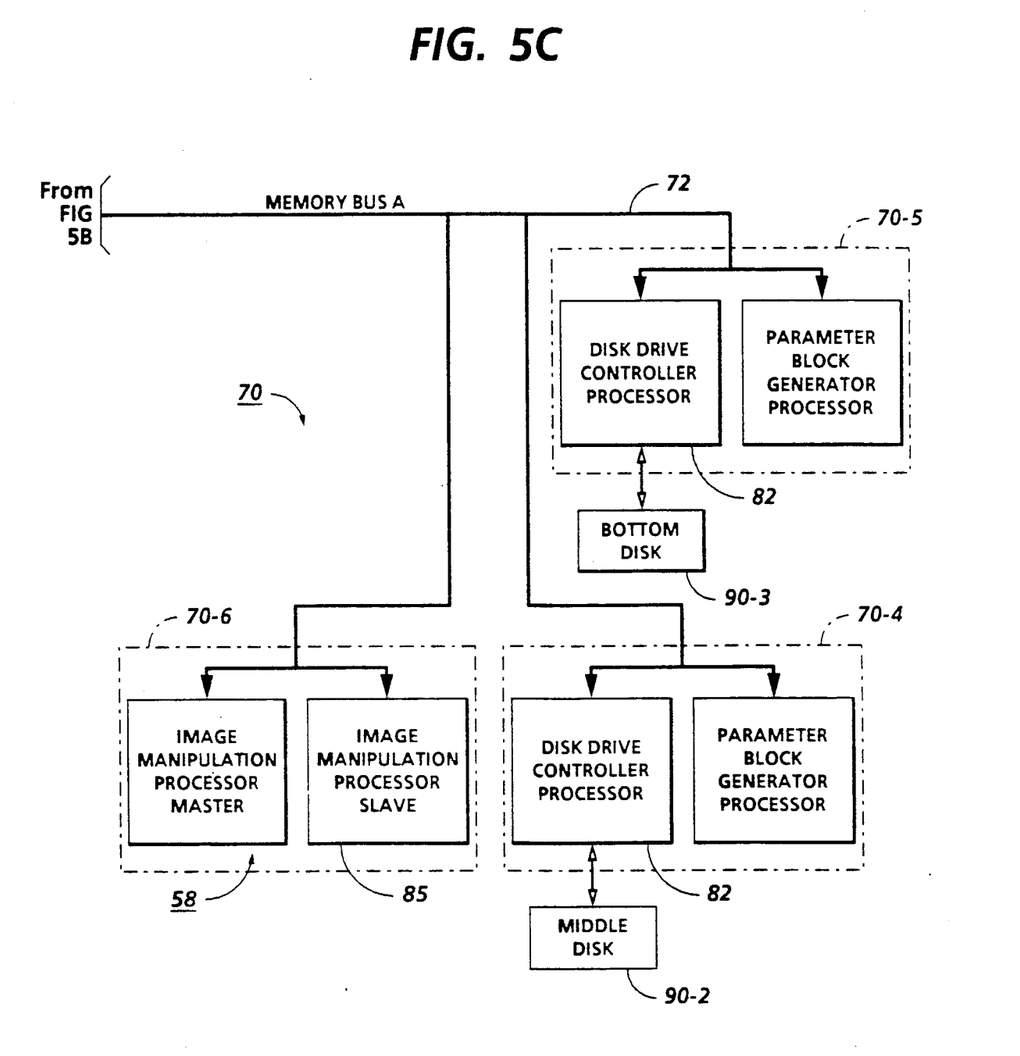

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having system processors 78; low speed I/O processor PWB 70-2 having UI communication controller 80 for transmitting data to and from UI 52;

PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
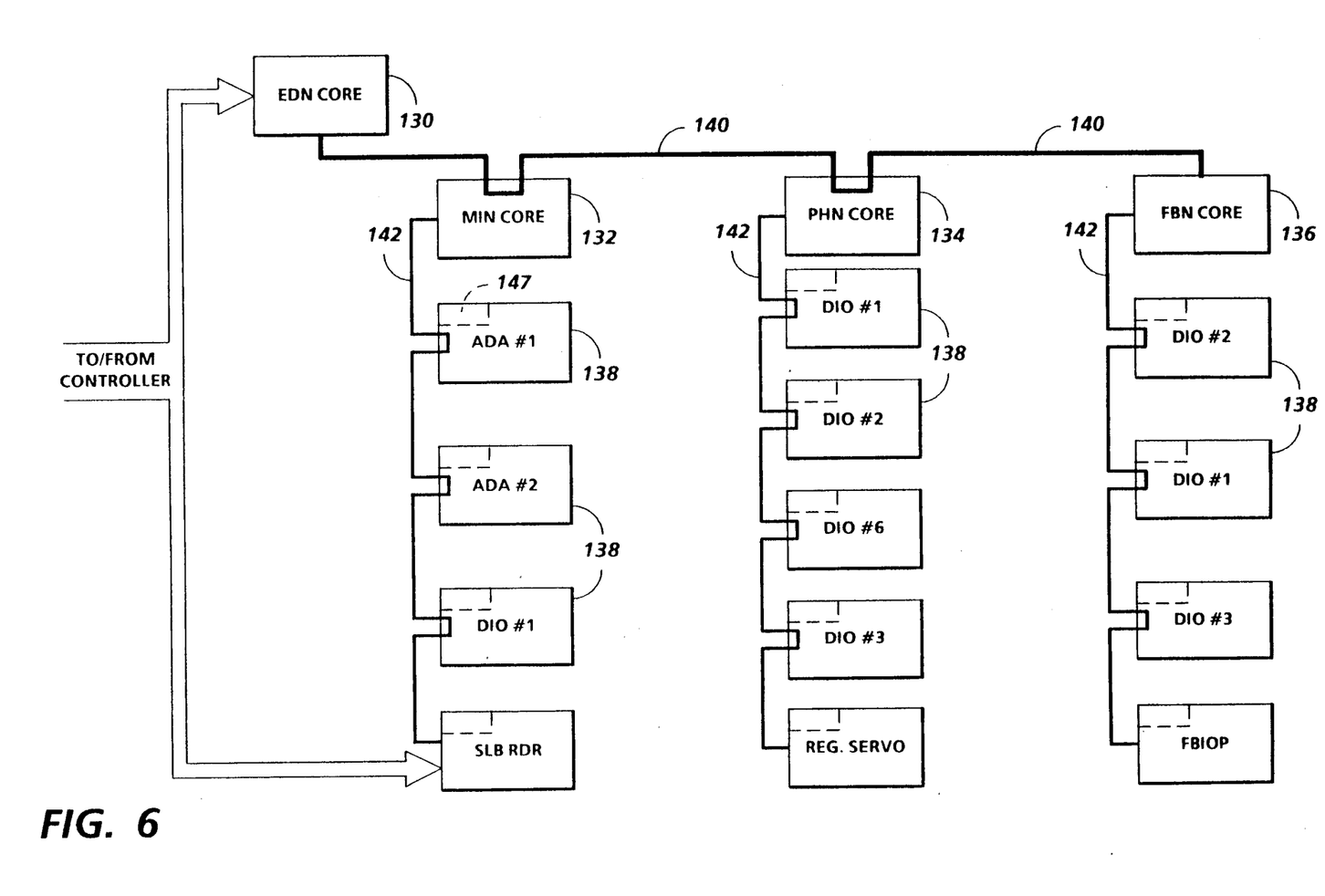
FIG. 6 is a block diagram depicting the Operating System, with Printed Wiring Boards and shared line connections.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIGS. 7-10, jobs are programmed in a Job Program mode in which there is displayed on touchscreen 62 a Job Ticket 150 and a Job Scorecard 152 for the job being programmed. Job Ticket 150 displays various job options available for programming the job while Job Scorecard 152 displays the basic instructions to the system for printing the job. In the programming example shown in FIG. 8, the "Quantity" icon on job scorecard 152 has been actuated, displaying a keyboard 153 through the use of which the number of prints to be made can be programmed.

Figure 7:
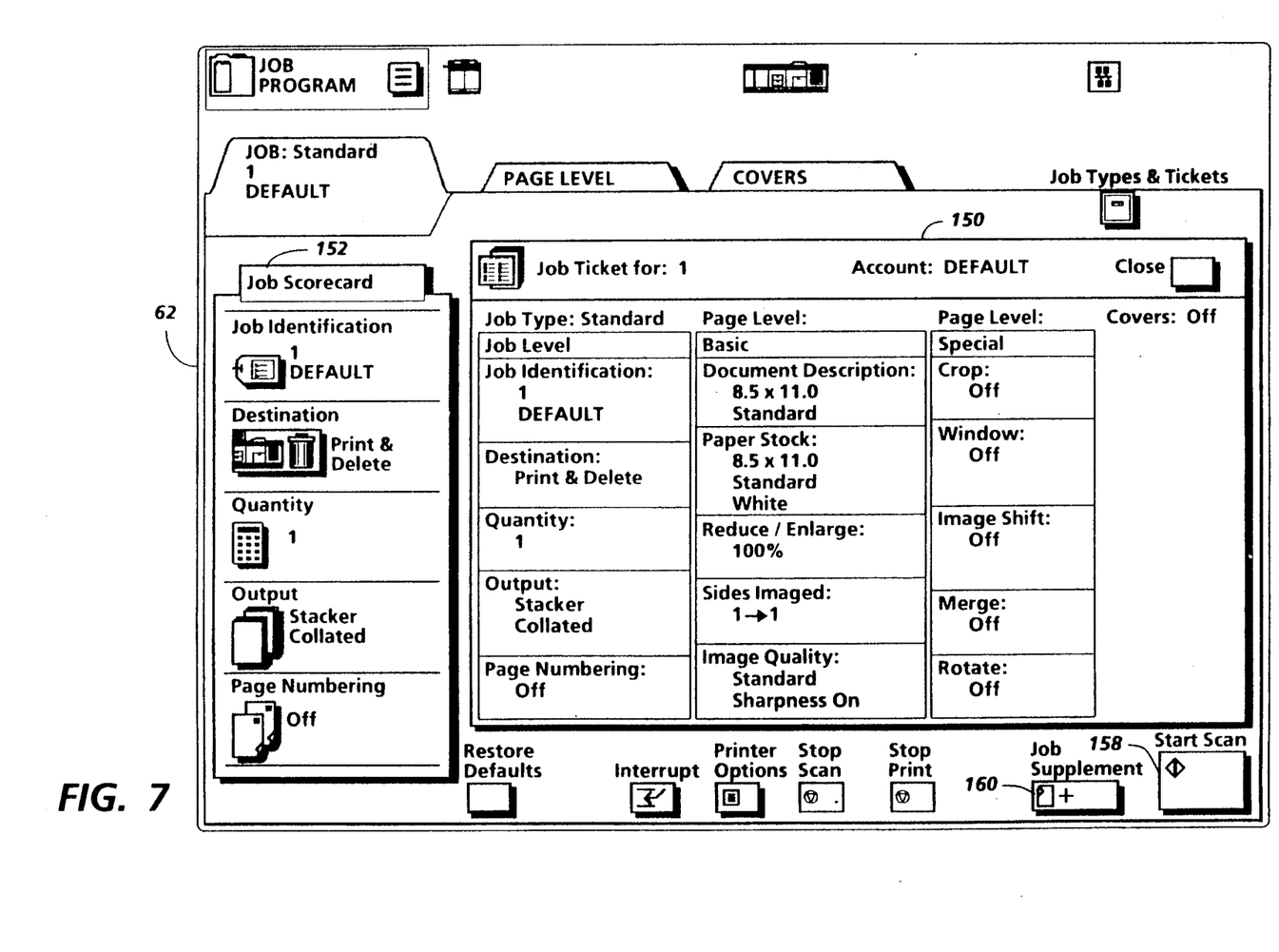
FIG. 7 is a view of the User Interface touchscreen display in the Job Programming mode displaying Job Ticket and Job Scorecard examples.
Figure 8:
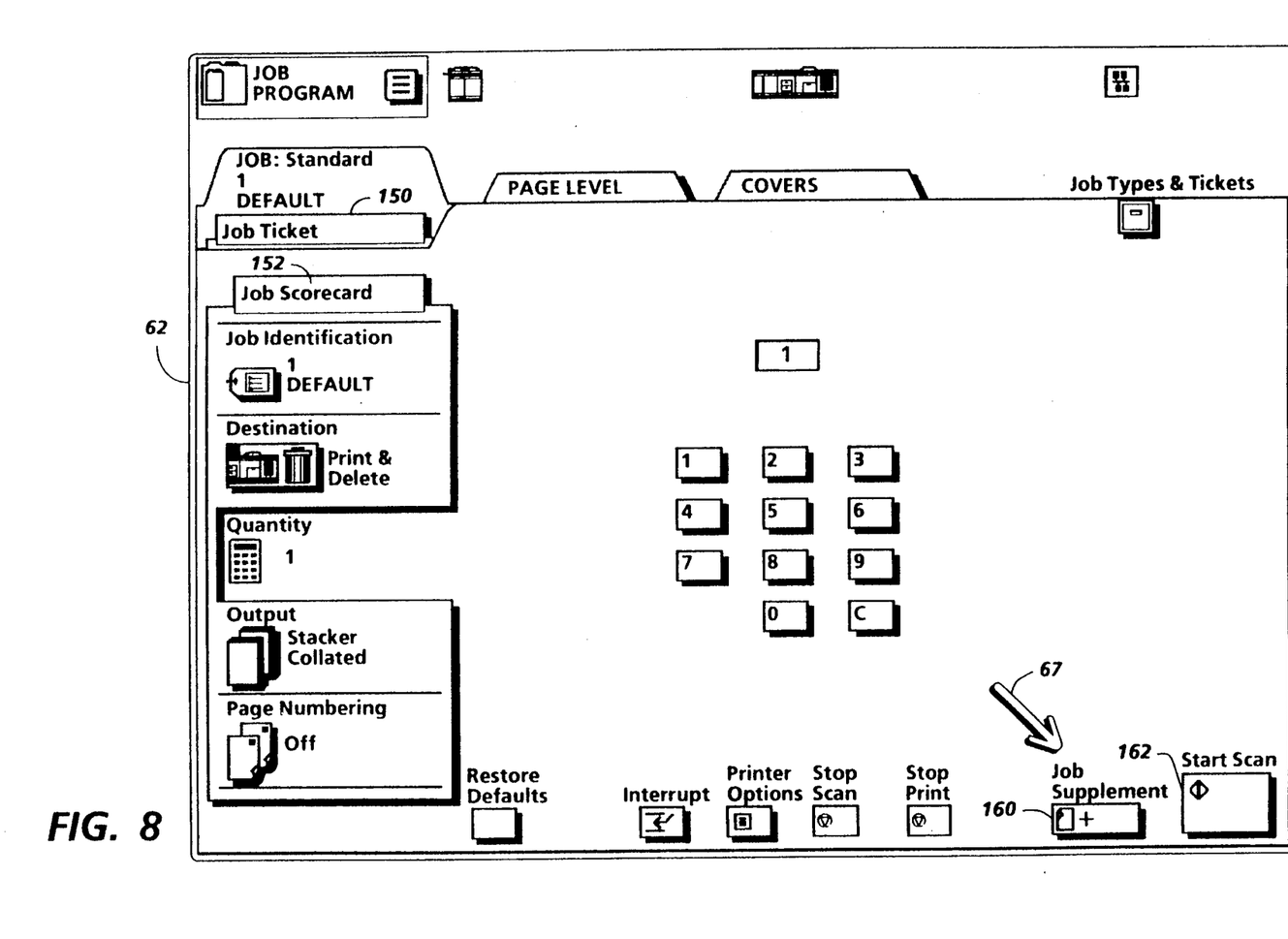
FIG. 8 is a view of the User Interface touchscreen display depicting the "JOB SUPPLEMENT" selection icon.

In cases where the operator, after programming a job, desires to add to or supplement the job with additional material, as for example where parts of the job are different (i.e., text with continuous tone, different color paper, etc.), where a job is too long to be placed in document handler 35 at one time, where the job contains documents requiring separate processing (i.e., different sizes, color, etc.), etc. the job supplement function of the present invention is used. The operator programs the supplemental job, creating a Job ticket 150 and Job Scorecard 152 therefor in the same manner as when programming a job as described above.

Figure 9:
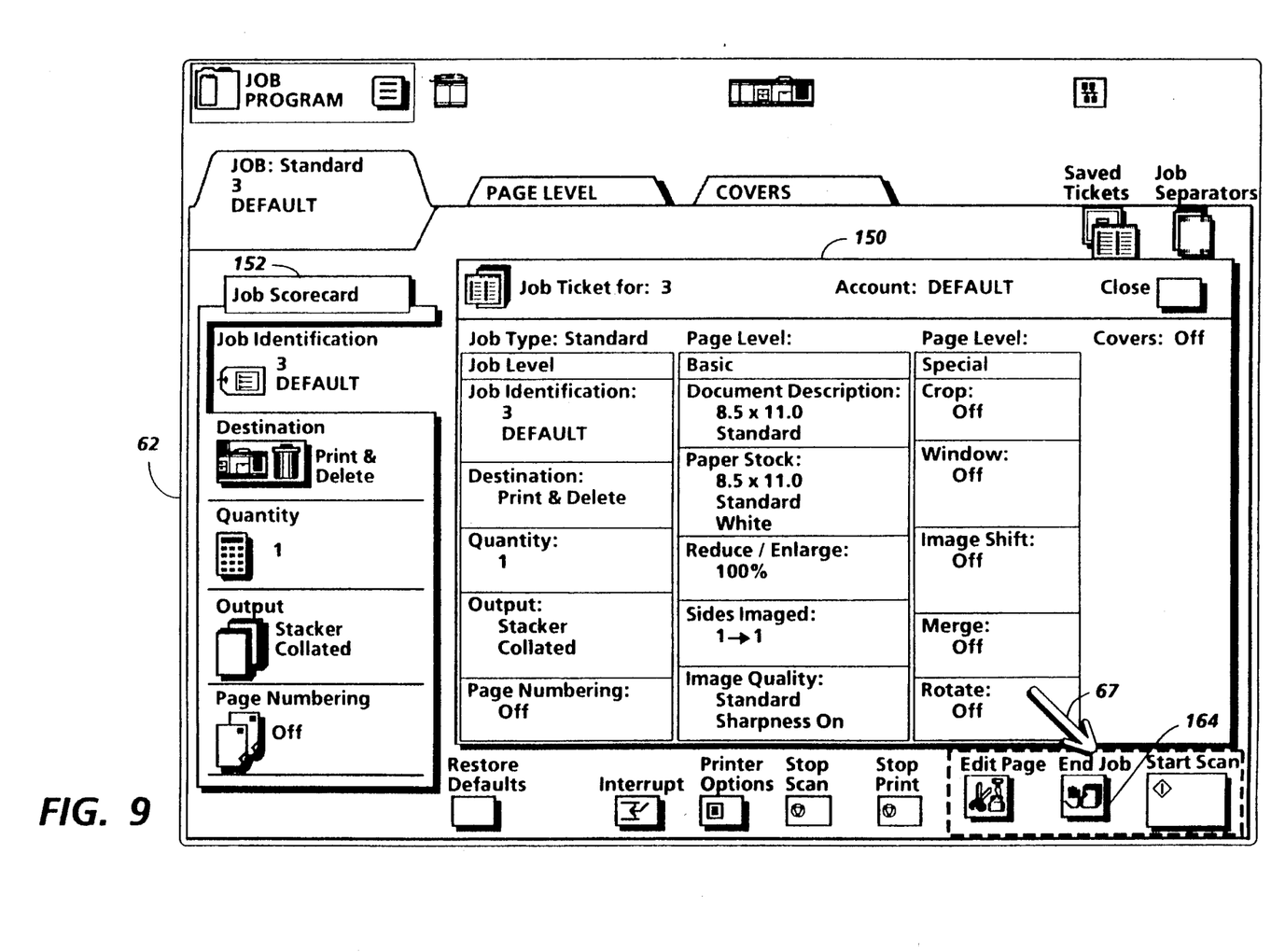
FIG. 9 is a view of the User Interface touchscreen display depicting the "END JOB" selection icon.

In cases where the documents that comprise the supplemental job are scanned in either the RDH mode or the CFF mode, Job Supplement must be implemented manually (Job Supplement Selected?). For this, a soft button in the form of an icon 160 labeled JOB SUPPLEMENT, which is displayed on touchscreen 62 by the system software, is actuated either by touching icon 160 on touchscreen 62 with a finger, or pointing the mouse cursor 126 displayed on touchscreen 62 to the JOB SUPPLEMENT icon and actuating mouse 66.

Where scanning takes place in the RDH mode (Scanning RDH/CFF Supplement), the operator places the documents that comprise the Job Supplement in document tray 37 of ADF 35 and actuates, the START SCAN icon 162 displayed on touchscreen 62 by touching the icon or by using mouse 66. After initiation of scan with the job supplement function activated, the JOB SUPPLEMENT icon 160 is replaced by an END JOB icon 164 (Make ENDJOB button available/Enable ENDJOB button), warning the operator that scanner section 7 is in the job supplement mode. Implementation of the job supplement function prevents scanning in of the next job by scanner section 7 until the job supplement function is cleared. Normally, this is effected by either touching the END JOB icon 164 or pointing to icon 164 by cursor 126 and triggering mouse 66.

The procedure is the same where the job supplement material is computer fanfold, except that ADF 35 is operated in the CFF mode instead.

Whenever ADF 35 is operated in the SADH, manual platen, or Book mode (Scanning SADH or Platen?), the job supplement function is automatically invoked. (Scanning SADH/Platen Supplement) As a result, JOB SUPPLEMENT icon 160 is replaced by the END JOB icon 164 (Make ENDJOB button available/Enable ENDJOB button) and scanning in of the next job is prevented until the job supplement function is cleared. This is also the case when ADF 35 is operated in the CFF mode to scan only a portion of the CFF stack (Scan CFF to a Page Selected?). As where the job supplement function is implemented manually by actuating JOB SUPPLEMENT icon 160, clearing of the job supplement function in these instances may be done manually by touching the END JOB icon 164 on touchscreen 62 directly or by pointing to icon 164 with cursor 126 and triggering mouse 66 (ENDJOB selected), or by selecting the RDH mode.

Figure 10:
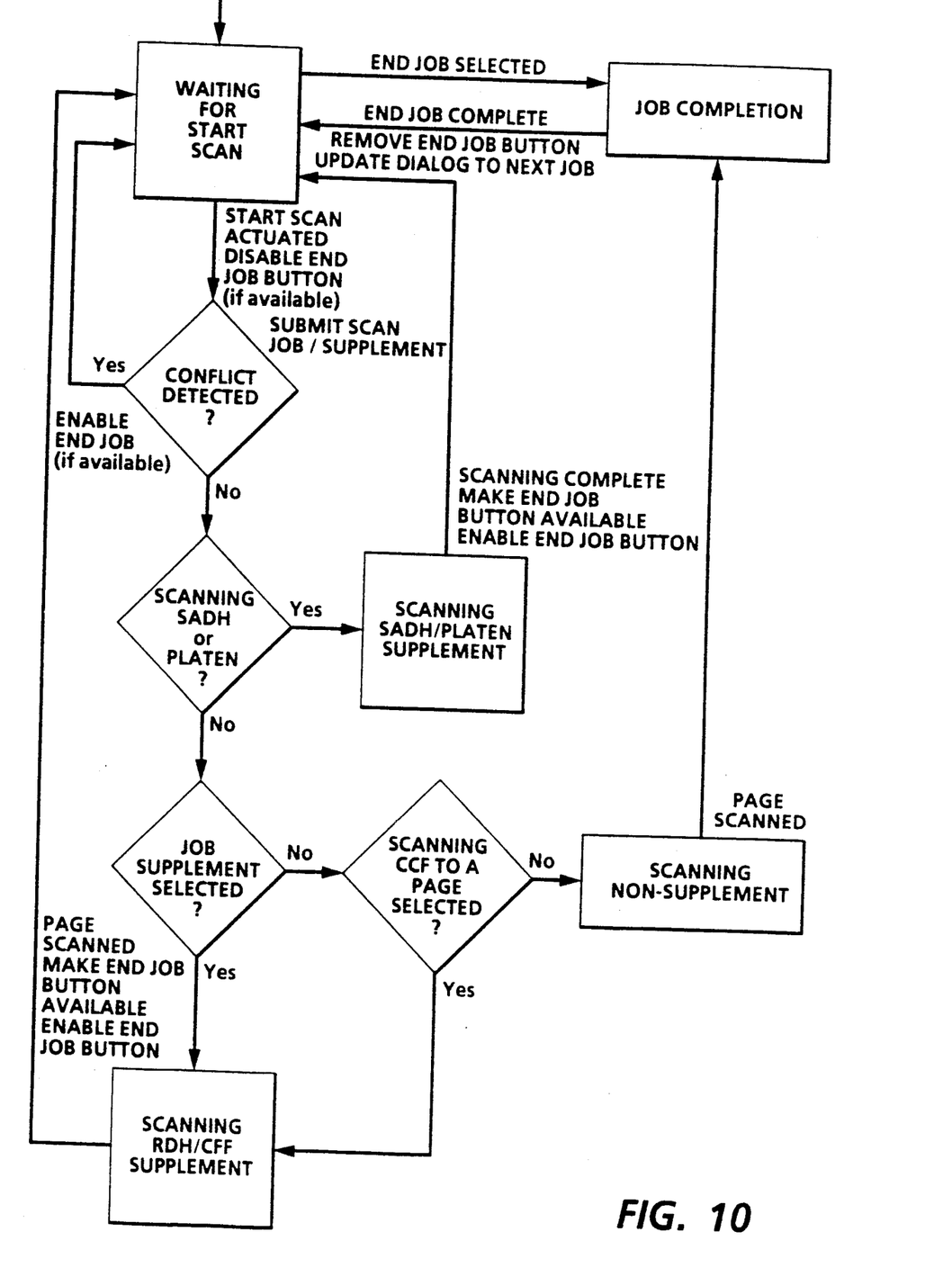
FIG. 10 is a flow chart showing the operational steps associated with the job supplement of the present invention.

Referring particularly to FIG. 10, there is shown the state transitions when operating in the Job Supplement mode. On actuation of START SCAN icon 162, a check is made to determine if a programming conflict exists (Conflict Detected). If so, END JOB icon 164 is enabled, preventing scanning of a new job until the conflict is cleared and END JOB icon 164 is disabled.

Where ADF 35 is operated in either the SADH or Platen mode to scan in the job supplement material (Scanning SADH or Platen?), Job Supplement is automatically invoked (Scanning SADH/Platen Supplement), enabling END JOB icon 164. As described, END JOB icon 164 must be disabled before scanning of the next job can begin.

Where the JOB SUPPLEMENT icon 160 is actuated (Job Supplement Selected?), operation of ADF 35 in either the RDH or CFF modes (Scanning RDH/CFF Supplement) enables END JOB icon 164 as described. And in instances where the CFF mode is programmed to scan to a preset page (Scan CFF to a Page Selected?), Job Supplement is automatically invoked (Scanning RDH/CFF Supplement), enabling END JOB icon 164 as described.

Where the job supplement function is enabled, any number of additional documents or groups of documents may be scanned in for addition to the job, either in a single pass or in a series of passes. Any of the scanner inputs, i.e., RDH, SADH, manual platen, Book mode, or CFF may be used for this purpose as described. As the documents representing each additional job segment are scanned in, the image data is processed, compressed, and stored on main memory 56.

When END JOB icon 164 is actuated (ENDJOB selected) or where the job is completed (ENDJOB complete), END JOB icon 164 is removed.

The image data comprising the job and the supplemental material may be accessed in main memory 56 and displayed on touchscreen 62 of UI 52. Preferably, touchscreen 62 is sized sufficiently large to enable plural pages of the scanned in job material to be displayed at once. Through the use of the various programming selection icons displayed on touchscreen 62, job pages and partial pages that make up the job may be edited, moved, processed, etc. to build up the job in the fashion desired. For example, pages from the supplemental material may be inserted at desired points in the job, excerpts and parts of the job moved to different locations in the job, enlarged, deleted, etc. until the job is set up in the manner desired. Further, where differences exist between the job parts, i.e., different resolution, size, etc., adjustment may be made using UI 52 to render the various parts of the job compatible with one another.

While the invention has been described with reference to the structure disclosed, it is not confined to the details set forth, but is intended to cover such modifications or changes as may come within the scope of the following claims.

We claim:

1. A process for job supplement in a printing system effective when actuated to enable a job supplement print job to be built up from a plurality of smaller print jobs, said printing system including document scanning means with a platen on which documents to be scanned are placed, said scanning means having automatic and manually assisted document handling modes for inputting documents to said platen for scanning and converting the documents to image signals for use in making prints, the steps comprising:
   a) automatically implementing job supplement in response to operation of said scanning means in said manually assisted document handling mode;
   b) manually implementing said job supplement in response to operation of said scanning means in said automatic document handling mode; and
   c) preventing scanning of a print job other than said job supplement print job by said scanning means in response to implementation of said job supplement.

2. The job supplement process according to claim 1 including the step of:
   disabling said job supplement in response to operation of said scanning means in said automatic document handling mode.

3. A job supplement process for a printing system effective when actuated to enable a print job to be built up from a plurality of smaller job sections, said printing system including a platen on which the job documents to be scanned are placed, a scanner for scanning said platen and converting documents on said platen to image signals, and document handling means having at least automatic document handling and manual document handling modes, the steps comprising:
   a) automatically implementing said job supplement process in response to operating of said document handling means in said manual document handling mode;
   b) preventing scanning of a new job by said scanner in response to implementation of said job supplement process;
   c) scanning documents comprising the first of said smaller job sections and converting the documents to image signals;
   d) scanning documents comprising the second of said smaller job sections and converting the documents to image signals;
   e) repeating step d until the documents comprising the last of said smaller job sections are scanned and the documents converted to image signals;
   f) using said image signals to produce prints; and
   g) on completing scanning of the last documents in the last of said smaller job sections, disabling said job supplement process to enable scanning of the next job by said scanner.

4. The job supplement process according to claim 3 including the step of:
   disabling said job supplement process in response to actuation of said document handling means in said automatic document handling mode.

5. The job supplement process according to claim 3 including the step of:
   preventing implementing of said job supplement process in response to operating of said document handling means in said automatic document handling mode.

6. A process for operating an electronic printing machine having scanning means for scanning in the pages that comprise each print job and converting said pages to electronic pages for use in making prints, and automatic and manually assisted document handling means for inputting documents to said scanning means for scanning, said machine including a job supplement selection to enable said machine to process special jobs having at least two independent job sections, comprising the steps of:
   a) inputting programming instructions to said machine for printing jobs;
   b) where one of said jobs comprises a special job, inputting programming instructions to said machine for printing said special job, said programming instructions including selecting said job supplement;
   c) inhibiting processing of non-job supplement jobs while job supplement is selected;
   d) scanning in the pages of a first of said job sections and converting said pages to electronic pages;
   e) scanning in the pages of a second of said job sections and converting said pages to electronic pages;
   f) repeating step e for each additional job section of said special job;
   g) processing the electronic pages obtained in steps d, e, and f to provide the prints called for by said programming instructions for said special job; and
   h) enabling programming of non-job supplement print jobs following scanning in of the last page in said special print job.

7. The process according to claim 6 including the step of:
   automatically selecting job supplement in response to programming said document handler for operation in said manually assisted mode.

* * * * *